United States Patent [19]

Johnson

[11] Patent Number: 5,040,749
[45] Date of Patent: Aug. 20, 1991

[54] SPACECRAFT BERTHING MECHANISM WITH DISCRETE IMPACT ATTENUATION MEANS

[75] Inventor: Caldwell C. Johnson, Dickinson, Tex.

[73] Assignee: Space Industries, Inc., Webster, Tex.

[21] Appl. No.: 313,497

[22] Filed: Feb. 22, 1989

[51] Int. Cl.⁵ .............................................. B64G 1/62
[52] U.S. Cl. .................................................... 244/161
[58] Field of Search ........... 244/161, 135 A, 102 S L; 114/249, 230, 352, 77 R; 49/505

[56] References Cited

U.S. PATENT DOCUMENTS

| | | | |
|---|---|---|---|
| 1,254,674 | 1/1918 | Gilbert | 267/9 R |
| 1,254,675 | 1/1918 | Gilbert | 267/9 R |
| 3,243,149 | 3/1966 | Burns | 244/100 |
| 3,391,881 | 7/1968 | Maltby | 244/161 |
| 3,426,869 | 2/1969 | Platus et al. | 188/1 |
| 3,582,133 | 6/1971 | DeLavenne | 296/65 |
| 3,603,433 | 9/1971 | Keathley et al. | 188/1 C |
| 3,608,848 | 9/1971 | Cantor et al. | 244/161 |
| 3,664,463 | 5/1972 | Kuethe | 188/1 C |
| 3,698,197 | 10/1972 | Bodey et al. | 61/46 |
| 3,820,741 | 6/1974 | Ratcliff | 244/161 |
| 3,910,533 | 10/1975 | Cheatham et al. | 244/161 |
| 4,046,361 | 9/1977 | Morse | 367/139 |
| 4,263,863 | 4/1981 | Leitch | 114/201 R |
| 4,381,092 | 4/1983 | Barker | 244/161 |
| 4,500,057 | 2/1985 | Duwelz | 244/161 |
| 4,682,745 | 7/1987 | Aures | 244/161 |
| 4,809,936 | 3/1989 | Whitaker | 244/161 |

FOREIGN PATENT DOCUMENTS

| | | | |
|---|---|---|---|
| 2834649 | 2/1980 | Fed. Rep. of Germany | 188/268 |
| 743996 | 4/1933 | France . | |

*Primary Examiner*—Galen Barefoot
*Assistant Examiner*—Christopher P. Ellis
*Attorney, Agent, or Firm*—Venable, Baetjer and Howard

[57] ABSTRACT

A spacecraft berthing mechanism comprises a peripheral flange adapted for attachment to a spacecraft port, an impact receiving member pivotably attached to the peripheral flange, and a motion damping device connected between the impact receiving device and the peripheral flange. Edge-on berthing between two such berthing mechanisms allows for placement of the impact receiving members and damping devices along only a minor portion of the circumference of the berthing interface, thereby minimizing both the weight and complexity of the structure. The motion damping devices are of the non-rebound type and reset automatically after absorbing berthing impacts.

43 Claims, 10 Drawing Sheets

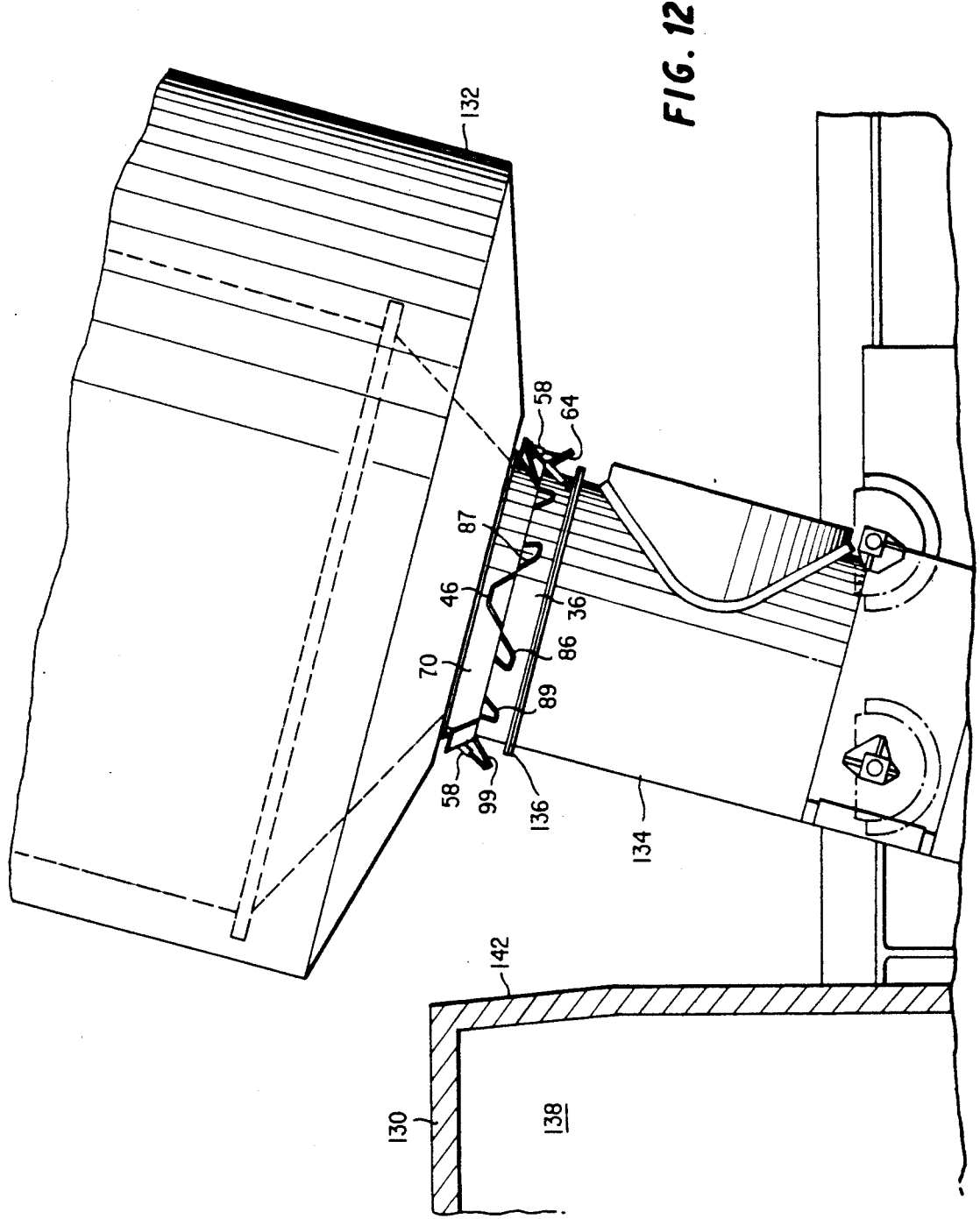

SPACECRAFT BERTHING MECHANISM WITH DISCRETE IMPACT ATTENUATION MEANS

BACKGROUND OF THE INVENTION

The present invention relates generally to apparatus for coupling spacecraft, and more particularly to a berthing apparatus having a construction which permits edge-on contact with a corresponding berthing apparatus so as to minimize the mechanical complexity and weight of the apparatus.

Spacecraft coupling apparatus provide a practical means for the mechanical joining of spacecraft for the logistical support and transfer through the coupling apparatus of crew members, for the mutual support of two or more spacecraft by a sharing of their individual facilities and capabilities, or to enable the on-orbit assembly of spacecraft. Other on-orbit operations that require spacecraft to be joined include the structural expansion of spacecraft, the addition or exchange of modules containing expendable supplies and equipment needed for space-borne experiments and manufacturing processes, and the on-orbit repair and maintenance of spacecraft. Many of these operations are best implemented by crew members moving between the spacecraft through a passage extending between the coupling apparatus in what is known as a shirt-sleeve environment, that is, in a pressurized, earth-like environment. The use of a properly designed coupling apparatus allows unrestricted passage of the crew between spacecraft without the need for cumbersome, restrictive pressure suits or potentially hazardous extravehicular maneuvers.

Spacecraft can be coupled to one another in one of two ways: docking and berthing. In both processes, the interfacing surfaces of coupling apparatus carried by the respective spacecraft must be fully coupled, or superimposed, by a force applied to the spacecraft. Docking and berthing differ in the manner in which the force is applied to the spacecraft. In docking, the coupling force arises from the momentum imparted to the spacecraft by propulsion means such as thrusters on one or both of the spacecraft. One or more alignment guides can be provided to facilitate rotational (clocking) alignment of the interface surfaces of the respective coupling apparatus. Because it is difficult to bring together two spacecraft in a manner such that their interface surfaces are properly rotationally aligned and superimpose completely upon initial contact, the spacecraft interfaces are typically at a slight angle when their leading edges first touch. Therefore, the kinetic energy associated with the relative velocity of the spacecraft must be sufficiently great so as to permit for the correction of slight rotational misalignment and complete superposition of the respective docking interfaces. Because the kinetic energy of the spacecraft is exhausted upon contact of the respective docking interfaces, insufficient relative velocity results in incomplete docking interface superposition and, therefore, a failed docking maneuver.

In contrast to docking, berthing provides a coupling procedure in which one spacecraft is joined to another by the force and directional control applied by an external positioning system, typically comprising a remotely controllable manipulator arm carried by one of the two spacecraft to be joined. The positioning system aligns and guides the interface surface of one spacecraft onto the interface surface of the other to permit spacecraft coupling. Unlike docking, the kinetic energy associated with the spacecraft incident to berthing is not exhausted upon initial contact of the respective interface surfaces. Instead, kinetic energy can be continuously exerted by the positioning system to effect optimal clocking alignment and spacecraft re-positioning until spacecraft coupling has been attained. Because of the comparatively smaller relative velocities and momentums associated with berthing as opposed to docking procedures, berthing mechanisms can be constructed to be less complex and lighter in weight than docking mechanisms constructed to effect coupling of two given spacecraft.

The apparatus which have heretofore been used for coupling spacecraft have generally been intended for docking rather than berthing. These prior art docking mechanisms are designed to approach their respective counterparts within a prescribed angle and direction. A nominal approach is one in which the docking mechanisms are aligned along a common axis so that the approach vector is normal to the plane of the coupling interface. However, the coordinated movement of two spacecraft along perfectly coincident bearings and at prescribed relative velocities or closing rates is a task which is very difficult to achieve. As a result of these operational considerations, known docking mechanisms are provided with alignment guides and impact attenuation devices around their entire circumference in order to accommodate the effects of vehicle misalignment and excessive closing rate, resulting in a relatively heavy and complex structure. These known docking apparatus are therefore expensive to manufacture, more prone to mechanical failure due to their complexity, and heavy as a result of all of the components they carry, thereby adversely affecting the payload-carrying capacity of the spacecraft to which the apparatus are mounted. For all of the foregoing reasons, berthing apparatus which are generally less mechanically complex, lighter in weight, and less expensive to manufacture than comparable docking mechanisms known in the art, are becoming increasingly more desirable for use in spacecraft coupling procedures.

Missions in space which will require the use of spacecraft coupling apparatus, particularly berthing apparatus, are currently in the planning stages. It is envisioned that, in the near future, the Space Transportation System (also referred to as the Space Shuttle Orbiter) developed in the United States by the National Aeronautics and Space Administration (NASA) will be used to service large, free-flying spacecraft, such as the proposed NASA Space Station and the Industrial Space Facility (ISF) developed by Space Industries Incorporated. Such spacecraft will be assembled and resupplied on orbit and will therefore require spacecraft coupling operations to be carried out on a frequent basis. Spacecraft coupling through the use of corresponding berthing apparatus is desirable, for it permits the precise alignment and coupling of one or more separate spacecraft with another spacecraft in a readily controllable manner. During the nominal operation of the Shuttle vehicle, berthing maneuvers will become more expedient through the use of a remotely controllable spacecraft positioning device such as the Remote Manipulator System (RMS), which is capable of grasping and maneuvering a free-flying spacecraft having a spacecraft berthing mechanism mounted thereon into engagement with a corresponding berthing mechanism mounted on another spacecraft, such as the Shuttle vehicle itself or one of the components of a space facility to be assembled.

SUMMARY OF THE INVENTION

The present invention provides a spacecraft berthing mechanism which overcomes the inherent limitations of previously proposed structures, particularly docking and currently envisaged berthing mechanisms having motion damping means distributed around the entire periphery of the mechanism for receiving a like mechanism from a range of angles.

In accordance with the invention, the berthing mechanism comprises a peripheral flange adapted for attachment to a spacecraft port, impact receiving means pivotably mounted to the peripheral flange, and motion damping means attached between the impact receiving means and the peripheral flange for resisting the pivoting movement of the impact receiving means. A spacecraft carrying the berthing mechanism can be maneuvered by means of an external positioning device such as a remotely controllable manipulator arm, so that the impact receiving means is brought into contact with a corresponding, opposing member of a similar berthing mechanism carried by a second spacecraft. The berthing mechanism can further include a plurality of traction and latching means adapted for temporary and semi-permanent coupling, respectively, with the corresponding berthing mechanism of the second spacecraft.

The berthing mechanism of the present invention is designed to effect coupling of two spacecraft by means of a berthing maneuver in which the berthing mechanism of one spacecraft is brought into edge-on contact with a similar berthing mechanism carried by the other spacecraft. Each berthing mechanism is attachable to a port or other aperture on the respective spacecraft in order to establish and maintain a passageway between the two spacecraft. Unlike known docking apparatus, the berthing mechanism of the present invention does not rely on a plurality of alignment guides and impact attenuators positioned along the entire circumference of the mechanism in order to accommodate misalignments. As a result, the mechanical complexity of the present berthing mechanism is minimized, and its operation is simplified. As opposed to known docking and berthing apparatus, the berthing mechanism of the present invention is less costly, weighs substantially less, and requires no retraction of subassemblies in order to effectuate spacecraft coupling.

In a preferred embodiment of the present invention, a berthing apparatus comprises first and second berthing mechanisms, each of which includes a peripheral flange adapted for attachment to a spacecraft port; impact receiving means pivotably attached to the peripheral flange of the first berthing mechanism; motion damping means attached to the impact receiving means and to the peripheral flange for resisting pivoting movement of the impact receiving means; and a fixed member attached to the peripheral flange of the second berthing mechanism at a position corresponding to the position of the impact receiving means of the first berthing mechanism, whereby the motion damping means includes means for resisting pivoting movement of the impact receiving means. The fixed member and impact receiving means can be restricted in position to a minor portion of the circumference of the peripheral flange of the berthing mechanisms.

The present invention further provides a non-rebounding, self-resetting motion damping system comprising a fixed frame member; an impact receiving member pivotably mounted on the fixed frame member and having a serrated surface; an impact attenuator including a canister pivotably attached to the frame member, a plunger unidirectionally movable within the canister, and friction means positioned within the canister for resisting movement of the plunger; a pivotable shoe carried by a free end of the plunger and having a first serrated surface adapted for engaging with the serrated surface of the impact receiving member, the direction of the respective surface serrations being arranged such that the shoe is slidable along the serrated surface of the impact receiving member in only a predetermined single direction; biasing means for exerting a restoring force on the canister in a predetermined rotational direction about a canister pivot axis, the restoring force tending to urge the pivoting shoe to slide along the impact receiving member's serrated surface in the predetermined single direction and to simultaneously cause the impact receiving member to rotate about its pivot axis; and stop means for limiting the pivoting movement of the impact receiving member. Pivoting movement of the impact receiving member is resisted by the frictional force exerted by the canister's friction means to insertion of the canister plunger. Preferably, the friction means exerts a progressively greater frictional force to movement of the plunger as the plunger advances into the canister in order that an essentially constant degree of impact attenuation is provided during successive motion damping cycles.

BRIEF DESCRIPTION OF THE DRAWINGS

The various objects, advantages, and novel features of the present invention will be more clearly understood from the following detailed description when read in conjunction with the appended drawings, in which:

FIG. 12 is a detailed side view of the berthing mechanisms depicted in FIG. 11, shown after completion of the berthing maneuver.

Throughout the drawings, like reference numerals will be used to refer to like parts.

DETAILED DESCRIPTION OF THE PREFERRED EMBODIMENTS

Figure 1:
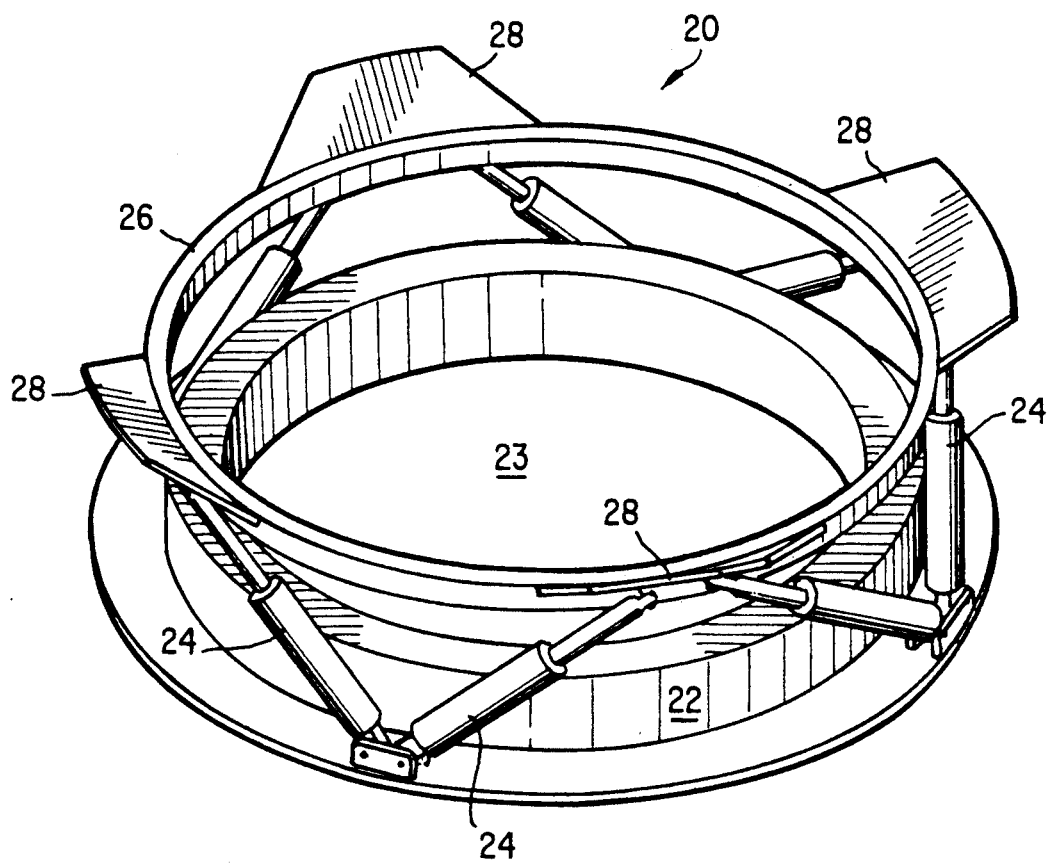
FIG. 1 is a perspective view of a docking mechanism according to the prior art.

FIG. 1 illustrates a docking mechanism 20 according to the prior art. The docking mechanism as shown is typically one of a pair of identical devices, each of which is mounted on separate spacecraft to facilitate their mechanical linking. A flange 22 is attachable to a port or other opening on the spacecraft in surrounding relationship thereto. An aperture 23 in the flange 22 allows the passage of crew members and materials through the respective port of the spacecraft. The flange 22 supports a plurality of impact attenuating struts 24 which carry a docking ring 26 that extends beyond the flange 22. The struts 24 are compressible when loaded and each has a motion damping characteristic. A plurality of equally spaced alignment guides 28 are rigidly attached to the ring 26. A retraction mechanism (not shown) is provided to retract the ring 26 into contact with the flange 22. The ring 26 is usually extended on only one of the pair of docking mechanisms prior to a docking maneuver, and the corresponding ring 26 on the other docking mechanism is retracted.

The prior art docking mechanism 20 is designed to approach its counterpart at an angle of nearly zero, that is, in a direction that is normal to the plane of the ring 26. After contact, which causes some displacement of the ring 26 by the force of the impact between the two spacecraft, mechanical latches (not shown) lock the two docking mechanisms together and the ring 26 is retracted to bring the two spacecraft together, thereby changing the spacecraft coupling from a "soft" dock to a "hard" dock. However, as two spacecraft cannot always be controlled so as to approach each other on perfectly coincident bearings, the docking mechanism 20 is designed to accommodate spacecraft misalignments and rates of closing from a range of directions. This necessitates the placement of struts 24 along the entire circumference of the docking mechanism 20, as shown. As a consequence, the docking mechanism is unduly heavy and undesirably complex in design, resulting in increased manufacturing expense and vehicle weight, and a corresponding decrease in payload carrying capacity. Moreover, since the ring 26 must be retracted for structural joining, a failure to retract will jeopardize the success of the docking maneuver.

Figure 2:
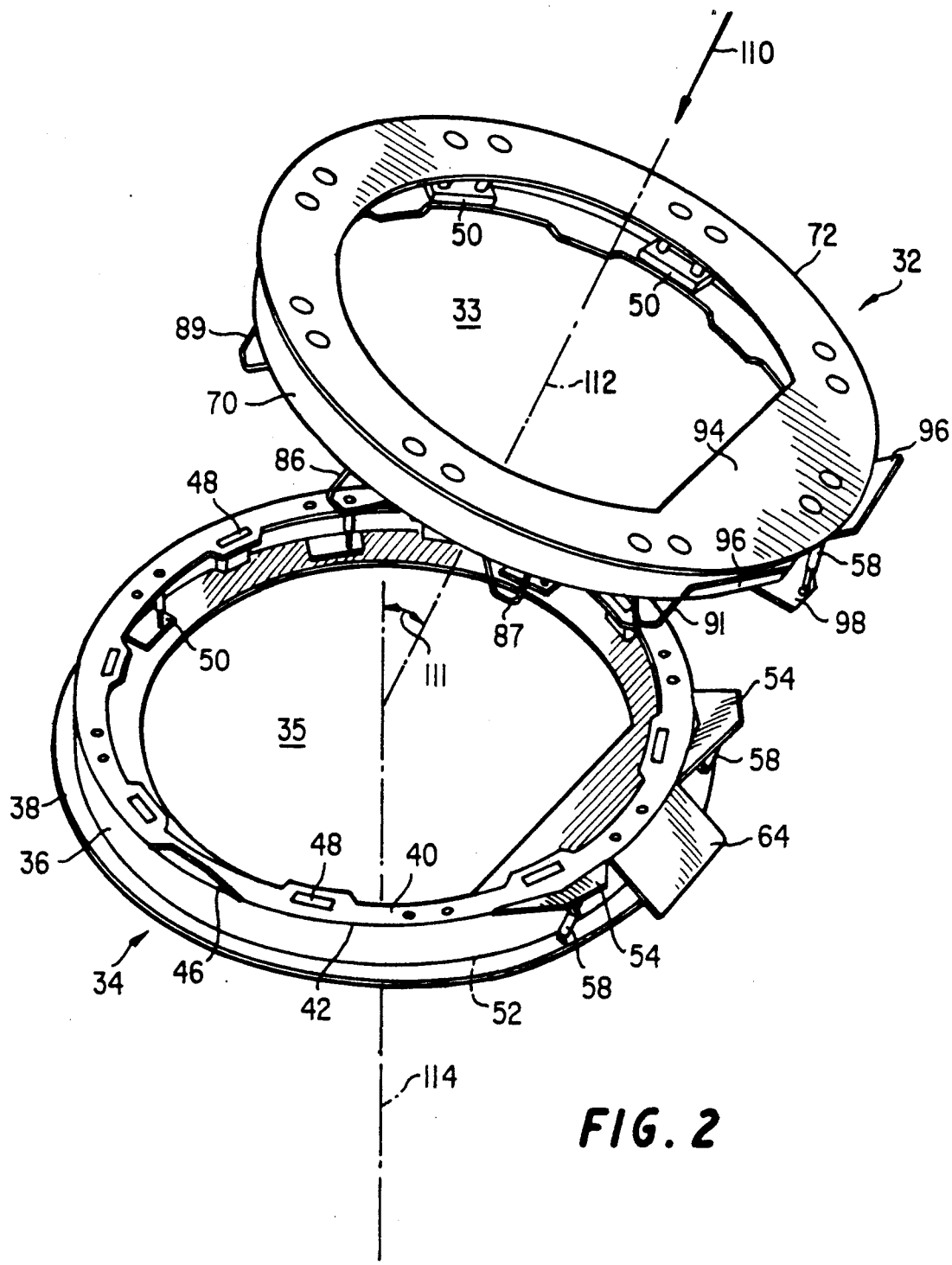
FIG. 2 is a perspective side view of a pair of berthing mechanisms constructed in accordance with the present invention, shown at the onset of berthing.
Figure 3:
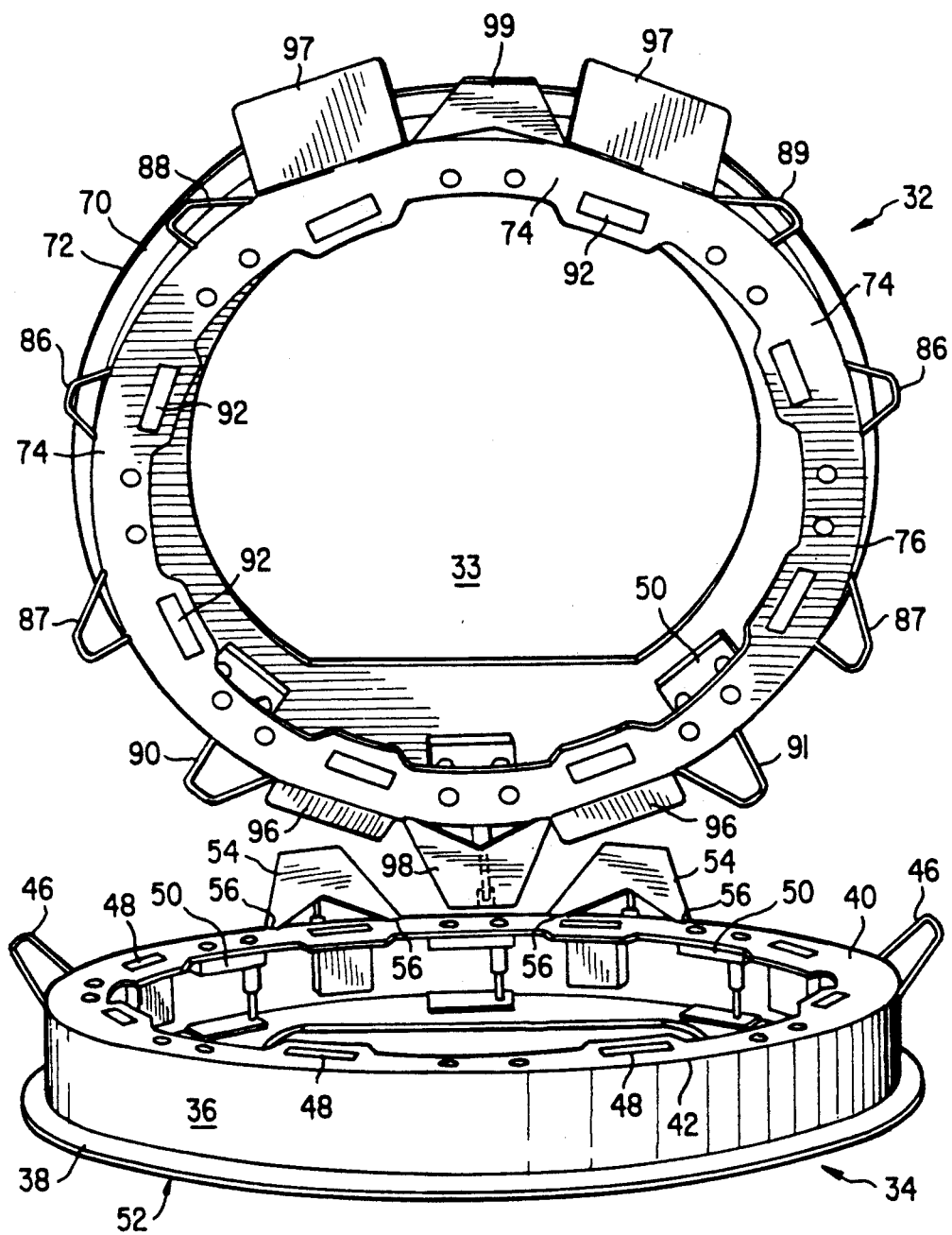
FIG. 3 is a front perspective view of the berthing mechanisms of FIG. 2, shown at a later stage of the berthing maneuver.
Figure 4:
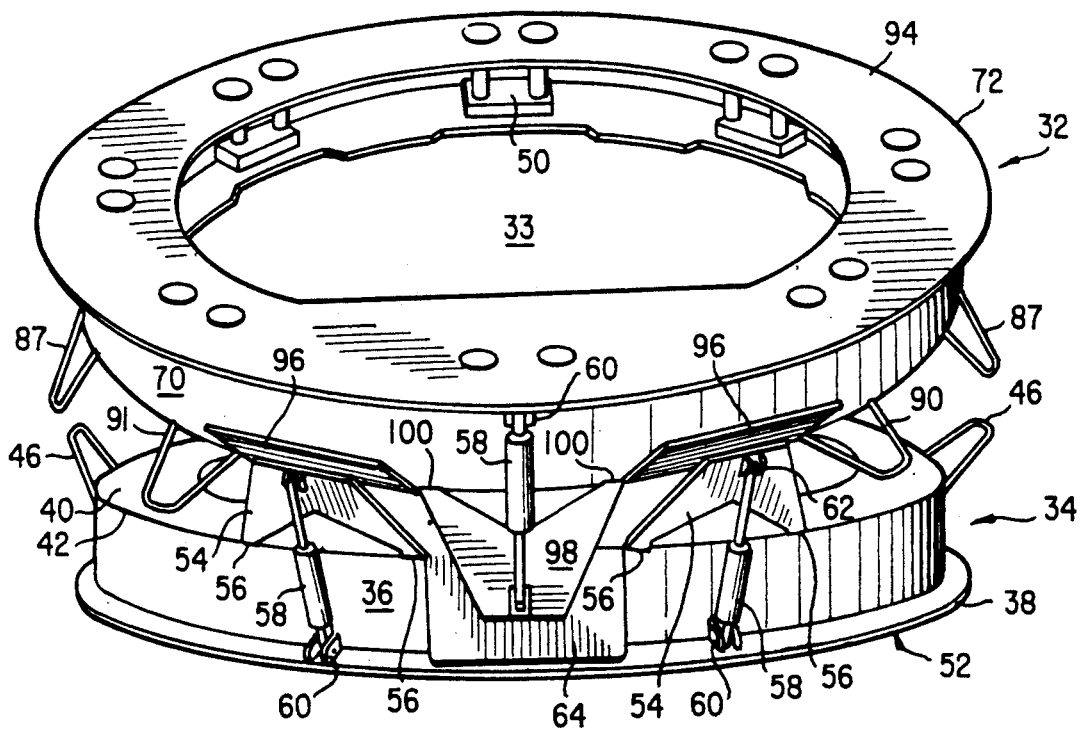
FIGS. 4 and 5 are rear and side elevational views, respectively, of the berthing mechanisms of FIG. 2, shown at the moment of initial contact.

FIGS. 2 through 4 illustrate an improved spacecraft coupling apparatus constructed in accordance with the present invention, and primarily intended for berthing rather than docking. In the illustrated embodiment, an upper berthing mechanism 32 is shown in spaced relation with a complementary lower berthing mechanism 34. The upper and lower berthing mechanisms 32 and 34 are each mountable on separate spacecraft (not shown) to facilitate the mechanical linking of the spacecraft. Each berthing mechanism 32 and 34 is attachable to the periphery of a port or other opening on the respective spacecraft in surrounding relationship thereto. Apertures or portals 33 and 35 in the berthing mechanisms 32 and 34, respectively, allow the unimpeded passage of crew members and materials through the respective ports of the spacecraft. In FIG. 2, the upper and lower berthing mechanisms 32 and 34 are shown in positions and alignment corresponding to the onset of berthing.

The lower berthing mechanism 34 includes a peripheral flange 36 having a lower rim 38 and an upper interface surface 40. The rim 38 is attachable to the periphery of a spacecraft port by any of a variety of fastening means known in the art. The peripheral flange 36 meets the interface surface 40 at an edge 42. The rim 38 continues inwardly along the underside of the lower berthing mechanism 34 to circumscribe the portal 35 in the flange 36. Affixed to the edge 42 is a spaced, opposing pair of alignment rails 46. Inset into the interface surface 40 are eight evenly spaced electromagnetic tractor magnets 48, each of which has an exposed face that is approximately flush with the interface surface 40. Midway between adjacent tractor magnets are structural latch assemblies 50 extending from the interface surface 40 adjacent the interior surface of the flange 36 to the rear rim surface 52.

Attached to the edge 42 along a minor portion of the circumference of the flange 36 is a pair of spaced alignment guides 54. Each alignment guide 54 is preferably configured as a generally trapezoidal planar member and includes two hinged joints 56 which connect the alignment guide 54 to the peripheral flange 36. Each alignment guide 54 is further supported by a motion damping strut 58 extending from a pivot 60 on the rim 38 to the lower face of the alignment guide 54. Between the alignment guides 54 and affixed to the peripheral edge 42 is a rigid planar ramp 64. Whereas the alignment guides 54 extend from the edge 42 in an upward direction away from the rim 38, the ramp 64 conversely extends in a downward direction toward the rim 38. Also, by virtue of their hinged joints 56, the alignment guides 54 are free to swing in a limited arc about the edge 42, whereas the ramp 64 is fixed in position.

As is illustrated in FIGS. 3 and 4, the upper berthing mechanism 32 is designed to mate with the lower berthing mechanism 34 and therefore includes elements similar to those described above, but arranged in a complementary fashion. The upper berthing mechanism 32 includes a peripheral flange 70 having a rim 72, an interface surface 74, and an interface surface edge 76. The rim 72 is attachable to the periphery of a spacecraft port by any of a variety of fastening means known in the art. The rim 72 continues inwardly along the underside of the upper berthing mechanism 32 to circumscribe the portal 33 in the flange 70. Affixed to the edge 76 is a plurality of radially-extending alignment rails 86, 87, 88, 89, 90, and 91. Inset into the interface surface 74 are eight metal tractor plates 92, each of which has an exposed face that protrudes slightly from the interface surface 74. The tractor plates 92 correspond in position to the tractor magnets 48 of the lower berthing mechanism 34. Midway between adjacent tractor plates, structural latch assemblies 50 extend from the interface surface 74 adjacent the interior surface of the flange 70 to the rear rim surface 94. The latch assemblies 50 also correspond in position to those of the lower berthing mechanism 34.

To complement the pair of alignment guides 54 and the ramp 64 of the lower berthing mechanism 34, spaced pairs of fixed ramps 96, 97 separated by pivotable alignment guides 98, 99 are attached to the edge 76 of the peripheral flange 70 of the upper berthing mechanism 32 and occupy minor portions of the circumference thereof. Each alignment guide 98, 99 is shaped as a generally trapezoidal planar member and includes two hinged joints 100 for connecting the alignment guide 98, 99 to the peripheral flange 70. Each alignment guide 98, 99 is further supported by a motion damping strut 58 extending from a pivot 60 on the rim 72 to the upper face of the alignment guide 98. The ramps 96, 97 are fixed in position and are mounted to the edge 76. Each of the alignment guides 98, 99 extends in a direction away from the rim 72 and is pivotable along a limited arc about the edge 76.

Figure 5:
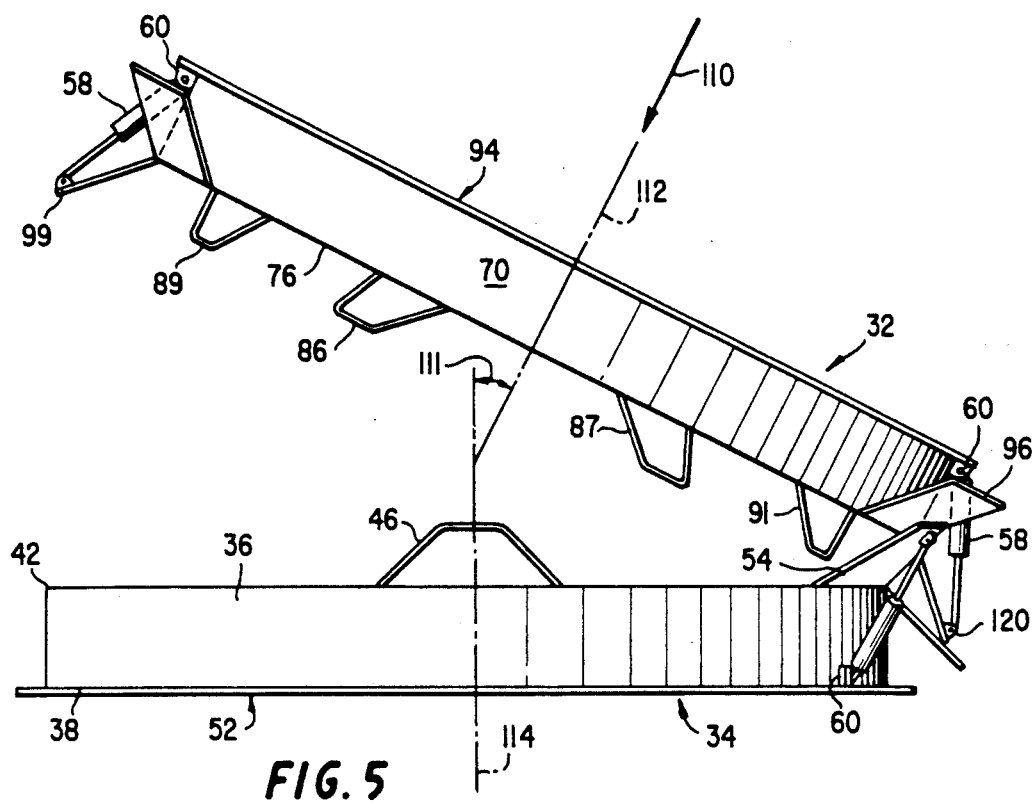
Figure 6:
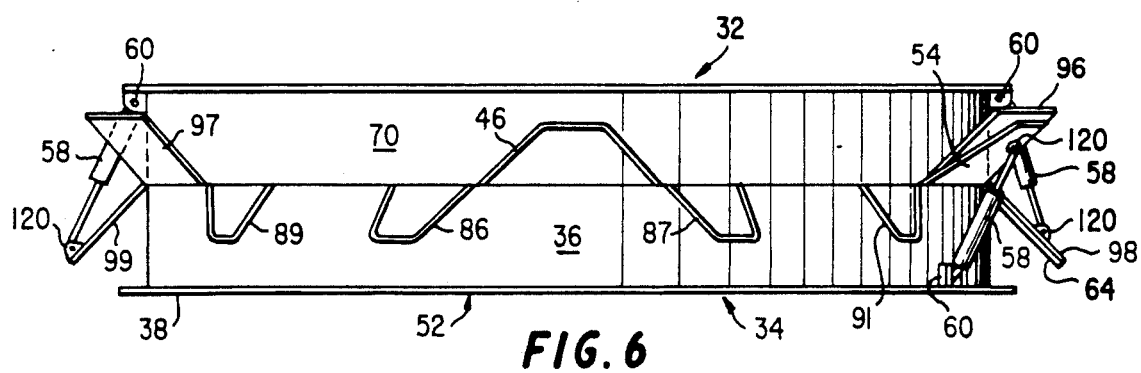
FIG. 6 is a side elevational view of the berthing mechanisms of FIG. 2, shown at the completion of the berthing maneuver.
Figure 7:
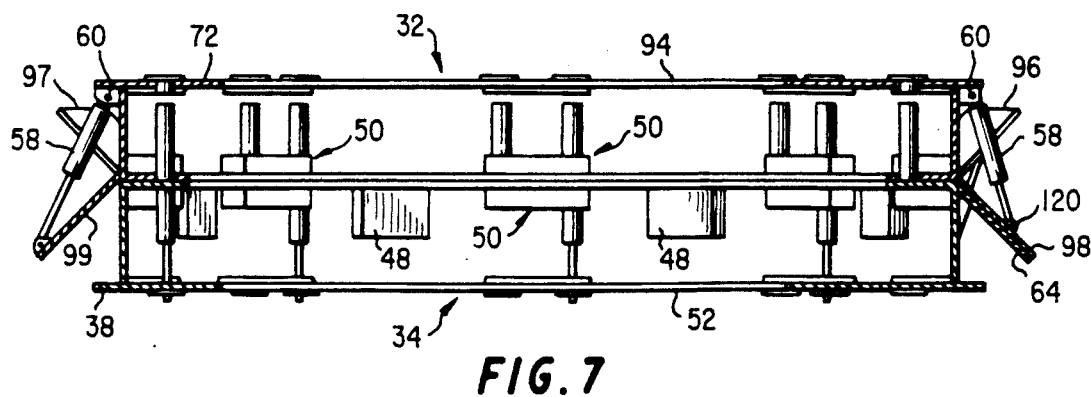
FIG. 7 is a cross-sectional view of the coupled berthing mechanisms depicted in FIG. 6.

With reference to FIGS. 5 through 7, a method for joining the upper and lower berthing mechanisms 32 and 34 will now be described. For the purposes of this description, the upper berthing mechanism 32 will be assumed to be in motion and the lower berthing mechanism 34 will be considered as stationary. However, the following discussion will be equally applicable to situations in which the upper berthing mechanism 32 is stationary and the lower berthing mechanism 34 is in motion, or in which both upper and lower berthing mechanisms 32 and 34 are in motion. Furthermore, for the purpose of consistency with the terminology generally used in the art, the mutual approach of the two berthing mechanisms will be referred to as "closing"; the rotation of one berthing mechanism about its central, vertical axis, when that axis intersects or is coincident with the corresponding axis of a second berthing mechanism, as "clocking"; the stages of initial contact and complete contact of the respective interface surfaces, as partial and full closure, respectively; the temporary connection of one berthing mechanism to the other after full closure of the interface surfaces, as the "capture phase"; and the semi-permanent mechanical locking together of the interface surfaces following the capture phases as "structural joining."

The coupling maneuver begins with the movement of the upper berthing mechanism 32 along an approach path 110 that is coincident with the vertical axis 112 of the upper berthing mechanism 32 and that is canted or inclined with respect to the vertical axis 114 of the lower berthing mechanism 34. Such movement of the upper berthing mechanism can be accomplished under the control of a positioning device, such as the Remote Manipulator System (RMS) carried by the NASA Space Shuttle Orbiter. This orientation of the upper berthing mechanism 32 relative to the lower berthing mechanism 34 may be established as the upper berthing mechanism 32 closes upon the lower berthing mechanism 34. Alternatively, the control of the upper berthing mechanism 32 during closing may be simplified by establishing the proper orientation before the closing motion is begun.

The coupling maneuver continues with the positioning of the upper berthing mechanism 32 in proximal alignment with the lower berthing mechanism 34. More specifically, the upper berthing mechanism 32 is brought to a position with respect to the lower berthing mechanism 34 such that all complementary parts will overlap or coincide as they are drawn together. This orientation of complementary parts can be maintained if the upper berthing mechanism 32 is clocked into one of two positions that differ by 180 degrees of rotation. The first, and preferred, orientation places the alignment guide 98 at the location of ramp 64, and ramps 96 at the locations of alignment guides 54, as shown in FIGS. 3 and 4. The second orientation places the remaining alignment guide 99 at the location of ramp 64, and ramps 97 at the locations of alignment guides 54. The preferred orientation, as shown in FIG. 3, arranges the berthing mechanisms such that the dimensions of the aperture defined by portals 33 and 35 in flanges 70 and 36, when respectively superimposed, are maximized.

The stage of partial closure of the upper berthing mechanism 32 and the lower berthing mechanism 34 is initiated by contact therebetween, as shown in FIGS. 4 and 5. The leading edge of alignment guide 98 contacts the upper surface of ramp 64 and the leading edges of alignment guides 54 contact the lower surfaces of ramps 96. The order of contact of the aforementioned elements is dependent upon the exact attitude of the upper berthing mechanism 32 in relation to the lower berthing mechanism 34, but is not critical. A three-point contact is established between the upper berthing mechanism 32 and the lower berthing mechanism 34 as the closure progresses and as the alignment guides 54 and 98 the corresponding contact ramps 64 and 96. As partial closure continues, the leading edge of each alignment guide travels along the proximate surface of the respective ramp, as the alignment guides pivot or rotate on their hinges 56, 100. Motion damping struts 58 resist this pivoting motion and thereby absorb the impact of the closing motion and decelerate the upper berthing mechanism 32 without rebound effects. Progressive contact between the alignment guides 54 and 98 and the ramps 64 and 96 aligns the interface surfaces 40 and 74. Partial closure is thereby established as the closing motion of the upper berthing mechanism 32 is arrested by the damping action of the struts 58.

Full closure of berthing mechanisms 32 and 34, as illustrated in FIGS. 6 and 7, is obtained by reducing to zero the angle 111 (indicated in FIGS. 2 and 5) between the central axis 112 of the upper berthing mechanism 32 and the central axis 114 of the lower berthing mechanism 34. As the angle 111 is reduced, and the central axes 112 and 114 become coincident, the interface surfaces 40 and 74 are brought into parallel, face-to-face contact. A proper superposition of the interface surfaces 40 and 74 is assisted by the interdigitation of the alignment rails. In particular, alignment rails 86 glide along corresponding alignment rails 46 (and against edge 42, if necessary) until closure is complete. Similarly, alignment rails 90, 91 glide against alignment guides 54 and against the edge 42; if necessary, alignment rails 46 also glide against edge 76. Alignment rails 88, 89 may also glide against the edge 42. Alignment guide 99 and ramps 97 are operable in the same fashion as described hereinabove when the orientation of the upper berthing mechanism 32 is clocked 180 degrees so as to position them complementary to alignment guides 54 and ramp 64.

As illustrated in FIG. 7, means are provided for establishing both temporary and semi-permanent coupling of the upper and lower berthing mechanisms 32, 34. At or before full closure of the interface surfaces 40 and 74, tractor magnets 48 are energized to attract and retain the tractor plates 92 (FIG. 3). By doing so, the upper and lower berthing mechanisms 32, 34 are drawn together and held by the magnetic attraction between each magnet 48 and its corresponding plate 92. The magnets 48 may be rapidly de-energized to release the upper berthing mechanism 32, and thus the magnetic coupling constitutes the temporary "capture phase" joining of the two berthing mechanisms. The magnetic coupling is also relatively fail-safe, in that the tractive force becomes negligible when the magnets 48 or their power supply fails. While the berthing mechanisms are magnetically coupled, a mechanical joining is established by operating the structural latches 50, after which the magnets 48 are de-energized. This provides a semi-permanent structural joining which couples together the berthing mechanisms for as long as the structural latches are engaged. The berthing mechanisms can be decoupled at any time by reversing the aforementioned process.

Figure 8:
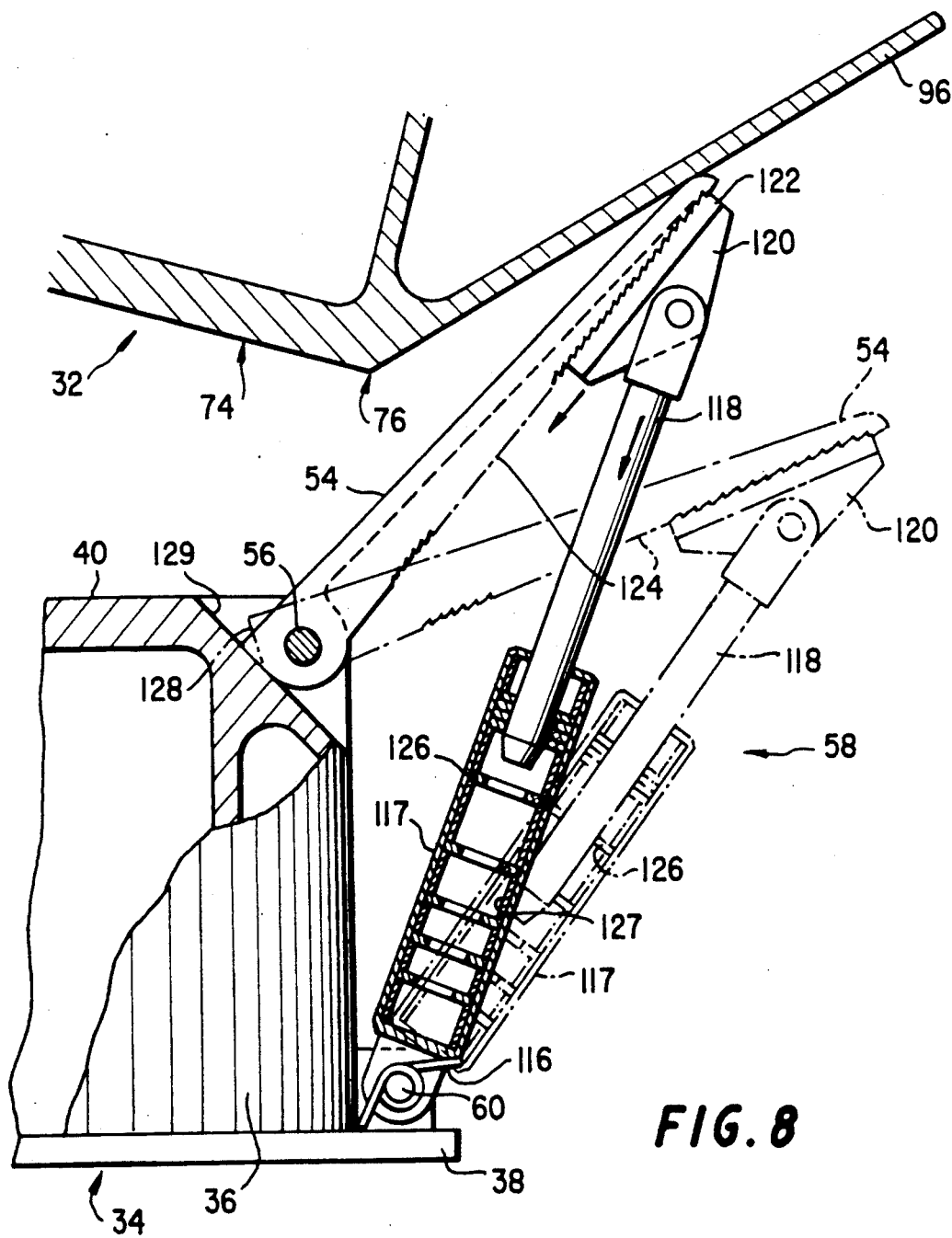
FIG. 8 is a sectional side view of the contact region of the berthing mechanisms depicted in FIGS. 4 and 5, illustrating the details of the motion damper.
Figure 9:
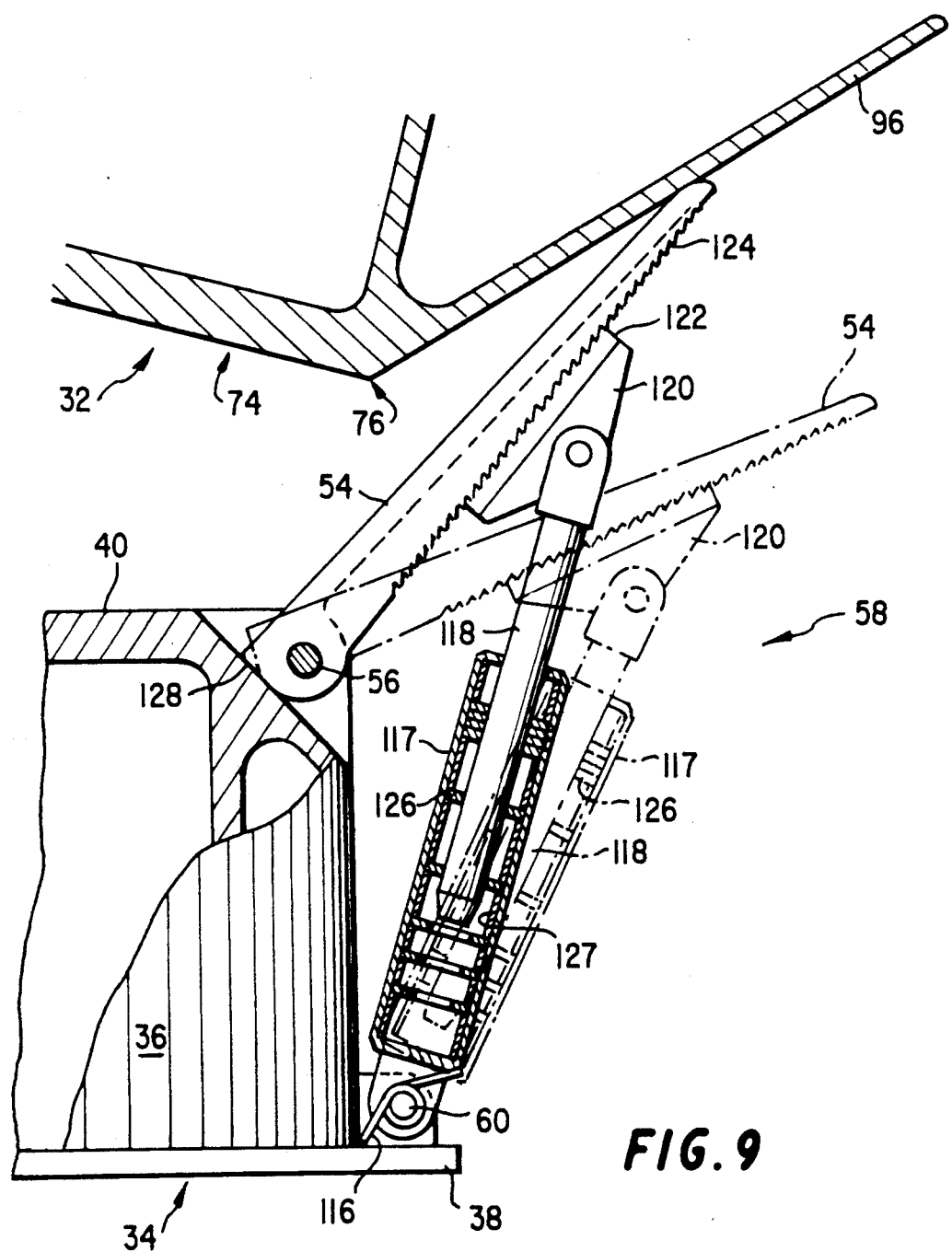
FIG. 9 is a sectional side view of the contact region depicted in FIG. 8, illustrating the motion damper after it has been compressed and reset.

The preferred embodiment of a motion damping strut 58 and its operation as a non-rebounding, self-resetting impact attenuator is illustrated in FIGS. 8 and 9 in connection with movement of alignment guide 54 in response to contact with ramp 96. However, it is to be appreciated that the following description of the strut 58 as a nonrebounding, self-resetting impact attenuator as set forth below is applicable to all of the struts 58 used throughout the berthing mechanisms 32 and 34. The strut 58 is attached to the lower berthing mechanism 34 by a pivot 60 at the corner between the peripheral flange 36 and the rim 38. The strut 58 is biased toward an upright position by a torsion spring 116 surrounding the pivot 60 and includes a canister 117 from which a movable plunger 118 extends. The upper end of the plunger 118 carries a pivoting shoe 120. A serrated surface 122 on the shoe 120 engages a similarly serrated surface 124 on the underside of the alignment guide 54. The direction of the serrations is such that the shoe 120 is prevented from traveling toward the free end of the alignment guide 54, but can travel in the opposite direction toward the hinge 56. A series of spaced friction washers 126 is distributed in the canister 117 so as to receive and frictionally engage the plunger 118 as the plunger travels into the canister 117. Spacers 127 are provided to maintain the predetermined positioning of the friction washers 126 within the canister 117. The torsion spring 116 forces the shoe 120 against the alignment guide 54 to maintain the mutual engagement of the serrated surfaces 122 and 124, and also forces the alignment guide 54 to an upright position limited by contact of the alignment guide shoulder 128 with the adjacent surface 129 of the flange 36.

With reference to FIG. 8, the alignment guide 54 is initially set at its fully upright position with the shoe 120 at the outermost position with respect to the alignment guide 54. In this relationship, the strut 58 and alignment guide 54 are at a first impact-receiving position, that is, they are capable of receiving the impact of the ramp 96 of the upper berthing mechanism 32 as it closes upon the lower berthing mechanism 34. Initial contact between the ramp 96 and the leading edge of the alignment guide 54 causes the alignment guide 54 to rotate about pivot 56 in a downward or clockwise direction from its upright position. As the alignment guide 54 rotates, the plunger 118 is forced into the canister 117 and engages an increasing number of friction washers 126. The washer 126 are spaced apart from one another in a predetermined, fixed spatial relationship by rigid spacer members 127. The canister 117 rotates about pivot 60 in response to the rotation of the alignment guide 54 until both reach the positions shown in phantom. The kinetic energy of the upper berthing mechanism 32 is dissipated as the friction washers 126 resist the movement of the plunger 118. Because the resistance encountered by the plunger 118 is entirely frictional, there is no rebounding of either the plunger within the strut 58 or of the alignment guide 54.

The strut 58 and alignment guide 54 are free to return to their respective upright positions after the upper berthing mechanism 32 is seated upon the lower berthing mechanism 34. More specifically, the strut 58 and the alignment guide 54 are reset by the force of the torsion spring 116 after the interface surface 74 of the upper berthing mechanism 32 is guided onto the interface surface 40 of the lower berthing mechanism 34. The plunger 118, having been compressed by the impact of the upper berthing mechanism 32, no longer extends from the canister 117 to the extent that it did in the first impact-receiving position. As the strut 58 is returned to its upright position by the torsion spring 116, the shoe 120 travels towards the hinged end of the alignment guide 54 by virtue of the ratcheting action of their respective cooperative serrated surfaces 122 and 124. After the alignment guide 54 reaches its fully upright position, as defined by the alignment guide shoulder 128, the shoe 120 is held against the alignment guide 54 by the torsion spring 116. At that point, the shoe 120 and the strut 58 may be considered as having been reset to a second impact-receiving position in preparation for a subsequent berthing maneuver, as shown in FIG. 9. The second impact-receiving position is maintained while the upper and lower berthing mechanisms 32 and 34 are fully closed and after the removal of the upper berthing mechanism 32 from the lower berthing mechanism 34.

With continued reference to FIG. 9, the strut 58 and alignment guide 54 are shown in the second impact-receiving position (in solid outline) at the onset of a second berthing maneuver. The ramp 96 again contacts the leading edge of the alignment guide 54 and causes the alignment guide 54 to rotate from its upright position. As the alignment guide 54 rotates, the plunger 118 is pushed further into the canister 117 and engages a succession of additional friction washers 126. While the canister 117 pivots in response to the movement of the alignment guide 54, the plunger 118 moves further into the canister 117 until the apparatus reaches the position shown in phantom. The kinetic energy of the second impact of the upper berthing mechanism 32 is again dissipated as heat as the friction washers 126 resist the thrust of the plunger 118.

The strut 58 and alignment guide 54 are free to return to a third impact-receiving position in the manner described above. Thus, it may be seen that during each successive impact, the plunger 118 travels farther into the canister 117 and engages additional friction washers 126. The additional washers 126 compensate for the change in leverage as the shoe 120 moves toward the pivot axis of the alignment guide 54, thereby maintaining an essentially constant level of resistance during successive impacts. The strut 58 will have accommodated the final impact when the shoe 120 reaches the portion of serrated surface 124 most proximate to the hinged end of the alignment guide 54. After the final impact, the strut 58 can be replaced with a fresh unit which is preset to the first impact-receiving position so as to accommodate another series of impacts. The strut 58 is therefore designed to accommodate several impacts, the precise number being determined by the geometry of the apparatus and the kinetic energy of the impacts. For the apparatus shown, approximately three impacts can be accommodated before the shoe 120 reaches the end of its travel. The total energy absorption of the strut 58 is determined by a number of factors, including the number and spacing of the washers 126, their coefficients of friction, and the depth of the plunger travel.

Figure 10:
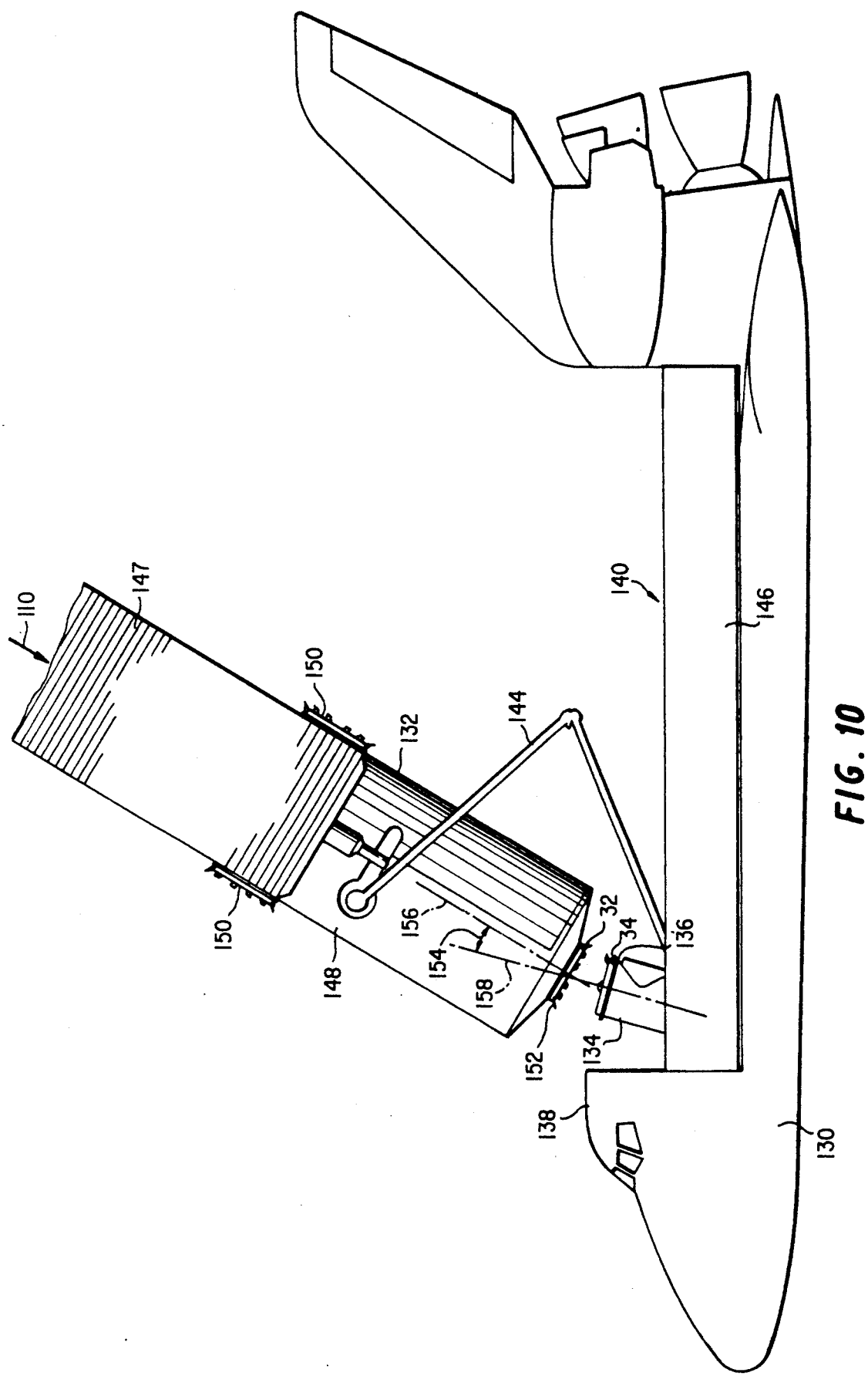
FIG. 10 is a side elevational view of a space vehicle equipped with a berthing mechanism of the type illustrated in FIGS. 1-9, depicted at the onset of berthing with a second spacecraft equipped with a similar berthing mechanism.
Figure 11:
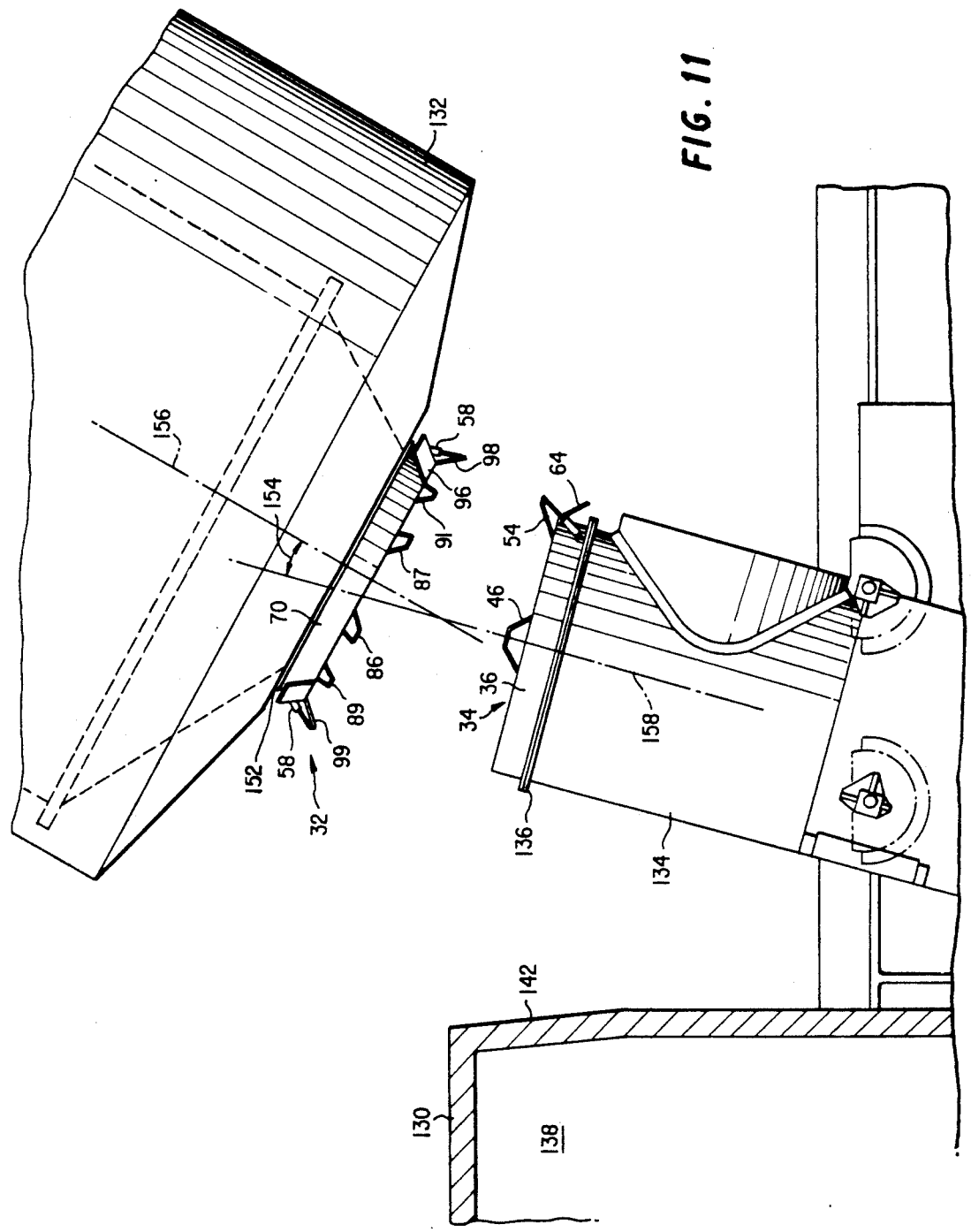
FIG. 11 is a detailed side elevational view of the berthing mechanisms of FIG. 10, with the adjacent portions of the respective spacecraft cut away.

FIGS. 10-12 illustrate a berthing maneuver between two spacecraft wherein a first spacecraft is fitted with a lower berthing mechanism 34 and a second spacecraft is fitted with an upper berthing mechanism 32. In the illustrated embodiment, the first spacecraft is a manned payload-carrying space vehicle 130 such as the NASA Space Shuttle Orbiter, and the second spacecraft is a crew-tended space platform 132 which is periodically resupplied by the Shuttle vehicle. The space vehicle 130 carries a docking adapter 134 which has a first docking port (not shown) communicating with the crew cabin 138 of the space vehicle 130 and a second docking port 136 for communicating with the interior of the space platform 132. The lower berthing mechanism 34 is fitted to the docking adapter 134 at the second docking port 136. Upon completion of berthing of the two spacecraft, a pressurized passageway is established between the interiors of the two spacecraft 130 and 132. The docking adapter 134 also provides a load-bearing mechanical connection between the two spacecraft 130 and 132 while they are docked.

The crew cabin 138 of the space vehicle 130 provides a shirt-sleeve environment in which the crew carry out the majority of flight control and mission-specific operations. A payload bay 140 is provided behind the crew cabin 138 for the storage and deployment of payloads. An aft cabin bulkhead 142 is situated between the cabin 138 and the payload bay 140. Payloads may remain in the payload bay 140 for the duration of the mission, as in the case of an attached payload such as the NASA/ESA Spacelab, or may be deployed by a remotely controllable manipulator arm 144 carried by the space vehicle 130. The payload bay 140 is enclosed by two longitudinal payload bay doors 146 (shown in the open position) to protect the space vehicle 130 and any payloads it may be carrying during launch and reentry.

The space platform 132 may be of any desired type, but in the illustrated embodiment it comprises a crew-tended facility used for carrying industrial or research payloads. By way of example, the payloads may be adapted to carry out materials processing operations, new product development, or life sciences research. The space platform 132 can be configured as a space-based factory for carrying out one or more of these processes automatically and without human supervision. The space platform also carries the necessary equipment to support its payloads, such as solar arrays 147, fluid tanks, pumps, batteries, power conditioning equipment, heat exchangers, and so on. The space platform 132 need not be permanently manned, but can include pressurization and life support equipment suitable for shirt-sleeve operation when coupled to the space vehicle 130.

Coupling of the space vehicle 130 with the space platform 132 enables the initial deployment of the space platform 132 and its subsequent resupply and modular growth. A platform module attachable to one or more similar modules can be carried into orbit by the space vehicle 130 as a payload in the payload bay 140. The module is adapted to be lifted by the arm 144 onto the docking adapter 134 as part of the initial deployment procedure. The modules are provided with grapple fittings 148 which can be engaged by the remote manipulator arm 144 to allow orbital emplacement and recapture. Each module can be provided with ports 150 at the module sides and with similar ports 152 (only one of which is shown) at the ends of the module. Each port 150 and 152 is fitted with an upper berthing mechanism 32 or a lower berthing mechanism 34, depending upon the requirements that are specific to the mission of the platform 132.

Once joined, the platform 132 can be entered by the space vehicle crew by passage from the cabin 138 to the docking adapter 134 and through the portals 33 and 35 in the flanges 36 and 70 of the berthing mechanisms 32 and 34. The module can thus be prepared for release into orbit. The space platform 132 can be expanded both in terms of size and mission capability by sequentially adding modules in a side-by-side arrangement. This can be achieved by using the arm 144 to capture an orbiting space platform 132 and place it onto the docking adapter 134, and then attaching an additional module, carried in the payload bay, to one of the ports 150, 152 of the captured platform 132. However, other spacecraft assembly techniques in which two or more spacecraft are to be temporarily or permanently joined to one another can be used in conjunction with the berthing apparatus of the disclosed invention.

As shown in FIGS. 10 and 11, the docking adapter 134 is canted with respect to the space vehicle 130. Consequently, the interface plane between the upper berthing mechanism 32 and the lower berthing mechanism 34 extends above the highest point of the aft cabin bulkhead 142. As a result, the space platform 132 may be attached to the docking adapter 134 while maintaining a predetermined minimum clearance between the surfaces of the space platform 132 and the space vehicle 130. At the same time, the docking adapter 134 is adapted to fit entirely within the confines of the payload bay 140 when the payload bay doors 146 are closed.

Further details concerning the preferred embodiment of the space platform 132 and its provisions for coupling and expansion can be found in commonly assigned U.S. Pat. No. 4,728,061, issued to Caldwell C. Johnson et al. on Mar. 1, 1988 entitled "Spacecraft Operable In Two Alternative Flight Modes"; in commonly assigned copending U.S. Patent Application of Maxime A. Faget et al., filed on Mar. 20, 1985 under Ser. No. 713,817 and entitled "Modular Spacecraft System"; in commonly assigned U.S. Pat. No. 4,747,567, issued to Caldwell C. Johnson et al. on May 31, 1988 and entitled "Spacecraft With Articulated Solar Array and Method for Array Deployment"; and in the commonly assigned copending U.S. patent application of Caldwell C. Johnson et al., filed on Nov. 27, 1987 under Ser. No. 125,993 and entitled "Apparatus and Method For Docking Spacecraft"; all of which are expressly incorporated by reference herein.

With successive reference to FIGS. 10, 11 and 12, a berthing maneuver between spacecraft carrying berthing mechanisms of the type contemplated by the present invention will now be described. The relationship of the space vehicle 130 and the space platform 132 just prior to berthing is illustrated in FIGS. 10 and 11. At the upper end of the docking adapter 134, a berthing mechanism 34 is provided for joining the space platform 132 to the docking adapter 134 as described earlier. The space platform 132 has been captured by the arm 144 through engagement of the arm's end effector with a grapple fixture 148 on the space platform 132. The arm 144 then manipulates the space platform 132 in a manner such that the upper berthing mechanism 32 on port 152 makes inclined or canted edge-on contact with the lower berthing mechanism 34 on the docking port 136. The space platform 132 is placed in proximal alignment with the docking port 136 of the docking adapter 134 such that the upper berthing mechanism 32 overlies the lower berthing mechanism 34 and all complementary parts are oriented to coincide as they are drawn together. As described hereinabove, the upper and lower berthing mechanisms 32, 34 allow berthing in clocking increments of 180°.

During the berthing maneuver, the platform 132, and hence the upper berthing mechanism 32, is manipulated by the arm 144 on an approach path 110 that is canted with respect to the central axis 158 of the lower berthing mechanism. The orientation of the upper berthing mechanism 32 relative to the lower berthing mechanism 34 may be corrected as the upper docking mechanism 32 closes upon the lower berthing mechanism 34. Alternatively, control of the upper berthing mechanism 32 during closing may be simplified by operating the arm 144 to establish the proper cant angle before the closing motion is begun.

The upper and lower berthing mechanisms 32 and 34 initiate berthing of the space platform 132 and the docking adapter 134 when the leading edge of alignment guide 98 contacts ramp 64, and the leading edges of alignment guides 54 contact ramps 96, respectively. Struts 58 absorb the impact of the closing motion and decelerate the advance of the space platform 132. Progressive contact between the alignment guides and the ramps causes the interface surfaces 40 and 74 to close on each other. Partial closure is thereby established without rebound by the damping action of the struts 58.

Full closure of the berthing mechanisms, as illustrated in FIG. 12, is obtained by causing the arm 144 to reduce to zero the angle 154 (indicated in FIG. 11) between the central axis 156 of the space platform and the central axis 158 of the docking adapter 134. At or before full closure of the interface surfaces 40 and 74, the tractor magnets 48 are energized to attract and retain the tractor plates 92. By doing so, the space platform 132 is drawn to the docking adapter 134 and temporarily held by the magnetic tractive force therebetween. The magnets 48 may be quickly de-energized after structural joining is achieved, or to release the space platform 132 if the berthing maneuver is unsuccessful or if there is an emergency. Each of the structural latches 50 on the upper and lower berthing mechanisms 32 and 34 is operable to structurally secure the upper and lower berthing mechanisms together, thereby securing the space platform 132 to the docking adapter 134 in a semi-permanent manner. The undocking or decoupling of the space platform 132 from the docking adapter 134 is effected by reversing the aforementioned procedure.

Once the upper and lower berthing mechanisms have been structurally joined to one another, the space platform 132 is fully mated to the docking adapter 134, and hence to the space vehicle 130, by means of a pressure-tight connection. The docking port 136 of the docking adapter 134 can then be opened and closed by means of a pressure-tight hatch (not shown). Similar hatches are operable in the docking ports 150 and 152 of the space platform 132. In this configuration, the space platform 132 can be resupplied or serviced, or additional modules carried in the payload bay 140 of the space vehicle can be added to the platform 132. The coupling of a module to the space platform 132 can be effected in the same manner as described above, but with temporary and semi-permanent coupling being accomplished between a side port of a module and a side port 150 of the space platform 132. Structural joining of the joined modules is effected by crew members operating the structural latches 50 from within the platform 132.

Although the present invention has been described with reference to a preferred embodiment, the invention is not limited to the details thereof. Other substitutions and modifications will occur to those of ordinary skill in the art, and all such substitutions and modifications are intended to fall within the spirit and scope of the invention as defined in the appended claims.

What is claimed is:

1. In combination with a spacecraft having a port, a spacecraft berthing mechanism comprising:
    a peripheral flange adapted for attachment to said spacecraft port;
    impact receiving means comprising a generally flat, hinged plate member that is pivotally attached to said peripheral flange; and
    motion damping means extending between said hinged plate member and said peripheral flange for resisting the pivoting movement of said hinged plate member.

2. The combination of claim 1, wherein said impact receiving means comprises of alignment guide.

3. The combination of claim 1, further comprising a stop member for limiting pivoting motion of said impact receiving means.

4. The combination of claim 1, wherein said hinged plate member extends generally radially outward from said peripheral flange.

5. The combination of claim 1, wherein said impact receiving means comprises a member having a generally trapezoidal shape for establishing rotational alignment between said docking mechanism and a corresponding second docking mechanism.

6. The combination of claim 1, wherein said impact receiving means is restricted to a minor portion of the circumference of said peripheral flange so as to accommodate edge-on coupling with a corresponding second berthing mechanism.

7. The combination of claim 1, further comprising a fixed member attached to said peripheral flange adjacent to said impact receiving means for actuating an impact receiving means of a corresponding second berthing mechanism.

8. The combination of claim 7, wherein said fixed member comprises a ramp extending generally radially outward from the periphery of said peripheral flange.

9. The combination of claim 7, wherein said peripheral flange defines a generally planar berthing interface and said impact receiving means and said fixed member extend in generally opposite directions from the plane of said interface.

10. The combination of claim 9, wherein said impact receiving means and the fixed member extend in generally opposite directions with respect to the plane of said interface.

11. The combination of claim 1, wherein said impact receiving means comprises first and second impact receiving members pivotably attached to said peripheral flange.

12. The combination of claim 11, further comprising:
    a fixed member attached to said peripheral flange between said first and second impact receiving members for actuating motion damping means of a second berthing mechanism.

13. The combination of claim 1, wherein said berthing mechanism further comprises latch means adapted for engaging a corresponding second docking mechanism.

14. A spacecraft berthing mechanism, comprising:
a peripheral flange adapted for attachment to a spacecraft port;
impact receiving means pivotably attached to said peripheral flange; and
motion damping means extending between said impact receiving means and said peripheral flange for resisting the pivoting movement of said impact receiving means, said motion damping means comprising a resettable, non-rebounding impact attenuator and means for resetting the non-rebounding impact attenuator.

15. The spacecraft berthing mechanism of claim 14, wherein said non-rebounding impact attenuator comprises:
a canister pivotably attached at one end thereof to said peripheral flange; and
a movable plunger having a first end disposed within said canister and a second end coupled to said impact receiving means, said second end of said plunger being movable in a single direction along said impact receiving means.

16. The spacecraft berthing mechanism of claim 15, wherein said canister further includes friction means for resisting movement of said plunger into said canister.

17. The spacecraft berthing mechanism of claim 15, wherein said coupling between the second end of said plunger and said impact receiving means comprises:
a pivotable member carried on the second end of said plunger, said pivotable member having a first serrated surface; and
a second serrated surface formed along said impact receiving means facing said pivotable member and engagable therewith to allow unidirectional movement of said pivotable member along said impact receiving member.

18. The spacecraft berthing mechanism of claim 17, wherein said resetting means comprises biasing means for urging said pivotable member in the direction of said unidirectional movement.

19. The spacecraft berthing mechanism of claim 18, wherein said biasing means comprises a torsion spring mounted about the pivot axis of said canister.

20. In combination with first and second spacecraft having first and second ports, respectively, a spacecraft berthing system comprising:
a first berthing mechanism attachable to the port of said first spacecraft, said first berthing mechanism comprising:
a fist peripheral flange adapted for attachment to said first spacecraft port;
an impact receiving means comprising a generally flat, hinged plate member that is pivotably attached to said first peripheral flange; and
motion damping means extending between said hinged plate member and said peripheral flange for resisting pivoting movement of said hinged plate member; and
a second berthing mechanism attachable to the port of said second spacecraft, said second berthing mechanism comprising:
a second peripheral flange adapted for attachment to said second spacecraft port; and
a fixed member attached to said second peripheral flange at a position corresponding to that of the impact receiving means of the first berthing mechanism.

21. The combination of claim 20, wherein said first and second peripheral flanges each define a generally planar docking interface.

22. The combination of claim 21, wherein said impact receiving means extends in a direction generally toward the berthing interface plane of the second berthing mechanism.

23. The combination of claim 20, wherein said first and second berthing mechanisms further comprise latch means for effecting a mechanical engagement of said berthing mechanisms.

24. The combination of claim 20, wherein said fixed means comprises a ramp extending radially outward from said peripheral flange.

25. The combination of claim 20, wherein said impact receiving means carried by said first berthing mechanism is restricted to a minor portion of the circumference of the first peripheral flange and said fixed member carried by said second berthing mechanism is restricted to a minor portion of the circumference of the second peripheral flange.

26. The combination of claim 20, wherein said impact receiving means extends generally radially outward from said peripheral flange.

27. The combination of claim 20, wherein said impact receiving means is shaped and positioned to effect rotational alignment of said first and second berthing mechanisms.

28. The combination of claim 20, wherein said plate member is provided with a generally trapezoidal configuration for facilitating rotational alignment of said second berthing mechanism with said first berthing mechanism.

29. The combination of claim 20, wherein said impact receiving means comprises first and second impact receiving means, each of which is pivotably attached to said first peripheral flange.

30. The combination of claim 29, wherein individual motion damping means is provided between each of said first and second impact receiving members and said first peripheral flange.

31. The combination of claim 30, wherein said fixed member comprises first and second ramps fixedly attached to said second peripheral flange and positioned complementary with said first and second impact receiving members so as to cause the first and second impact receiving members to pivot upon contact between said first and second berthing mechanisms.

32. The combination of claim 31, further comprising:
a third ramp fixedly attached to said first peripheral flange at a position between said first and second impact receiving members;
a third impact receiving member attached to said second peripheral flange at a position between said first and second fixed members; and
motion damping means connected between said third impact receiving member and said second peripheral flange for resisting pivoting movement of said third impact receiving member;
wherein said third ramp is positioned complementary with said third impact receiving member so as to cause the impact receiving member to pivot upon contact between said first and second berthing mechanisms.

33. The combination of claim 32, wherein said second berthing mechanism further comprises:
a fourth ramp fixedly attached to said second peripheral flange; and a fourth impact receiving member pivotably attached to said second peripheral flange;

wherein said fourth ramp and said fourth impact receiving means are positioned adjacent one another and are attached to said peripheral flange of said second berthing mechanism at positions generally diametrically opposed to said first fixed member and said second impact receiving means, respectively; and motion damping means attached between said fourth impact receiving member and said peripheral flange of said second berthing mechanism for resisting pivoting movement of the fourth impact receiving member.

34. A spacecraft berthing system, comprising:

a first berthing mechanism attachable to a port on a first spacecraft, said first berthing mechanism comprising:
- a first peripheral flange adapted for attachment to said first spacecraft port;
- an impact receiving means pivotably attached to said first peripheral flange; and
- motion damping means extending between said impact receiving means and said peripheral flange for resisting pivoting movement of said impact receiving means, said motion damping means comprising a resettable, non-rebounding impact attenuator and biasing means for resetting the nonrebounding impact attenuator;

a second berthing mechanism attachable to a port on a second spacecraft, said second berthing mechanism comprising:
- a second peripheral flange adapted for attachment to said second spacecraft port; and
- a fixed member attached to said second peripheral flange at a position corresponding to that of the impact receiving means of the first berthing mechanism.

35. The spacecraft berthing system of claim 34, wherein said non-rebounding impact attenuator comprises:
- a canister pivotably attached at one end thereof to the first peripheral flange; and
- a movable plunger having a first end disposed within the impact attenuator and a second end coupled to said impact receiving means, said second end of said plunger being movable in a single direction along the impact receiving means.

36. The spacecraft berthing system of claim 35, wherein said biasing means comprises a torsion spring mounted about the pivot axis of said canister.

37. The spacecraft berthing system of claim 35, wherein said canister further includes friction means for resisting movement of said plunger into said canister.

38. The spacecraft berthing system of claim 35, wherein the coupling between said non-rebounding impact attenuator and said impact receiving means comprises:
- a pivotable member carried on said plunger second end and having a first serrated surface; and
- a second serrated surface formed along said impact receiving means facing said first serrated surface and engagable therewith to allow unidirectional movement of said pivotable member along said impact receiving means.

39. The spacecraft berthing system of claim 38, wherein said impact receiving means includes a stop member for limiting the range of movement thereof.

40. In a spacecraft comprising a crew cabin and a berthing mechanism for joining said spacecraft to a second spacecraft and for allowing crew passage therebetween, the berthing mechanism comprising a peripheral flange, impact receiving means, and motion damping means mounted between said peripheral flange and said impact means, the improvement wherein:
- the impact receiving means comprises a generally flat, hinged plate member that is pivotably attached to the peripheral flange; and
- said motion damping means is restricted to a minor portion of the circumference of said peripheral flange.

41. A non-rebounding, self-resetting motion damping system, comprising:
- a fixed frame member;
- an impact receiving member pivotably mounted on said frame member, said impact receiving member having an impact-receiving surface on one side thereof and a serrated surface on an opposite side thereof;
- an impact attenuator comprising a canister, a plunger movable in said canister, and friction means positioned within said canister for resisting said plunger movement, said canister being pivotably attached to said frame member;
- a pivotable shoe carried by said plunger, said pivoting shoe having a serrated surface which faces and is engagable with the serrated surface of the impact receiving member, the direction of the respective surface serrations being such that the pivotable shoe is slidable along the impact receiving member only in one predetermined direction;
- biasing means for exerting a restoring force on said canister in a predetermined rotational direction about a canister pivot axis, said force tending to urge the pivoting shoe to slide along the serrated surface of the impact receiving member in said predetermined direction and to simultaneously cause the impact receiving member to rotate about its pivot axis; and
- stop means for limiting pivoting movement of the impact receiving member.

42. The non-rebounding, self-resetting motion damping system of claim 41, wherein said friction means exerts a progressively greater frictional force to resist movement of the plunger as the plunger is moved further into the canister, whereby the impact attenuator exerts an essentially constant degree of impact attenuation during successive motion damping cycles.

43. The non-rebounding, self-resetting motion damping system of claim 41, wherein said biasing means comprises a torsion spring.

* * * * *